April 7, 1964  R. A. BURRIS ETAL  3,128,089
SUSPENSION AND HEIGHT CONTROL SYSTEM FOR VEHICLES
Filed Aug. 25, 1961
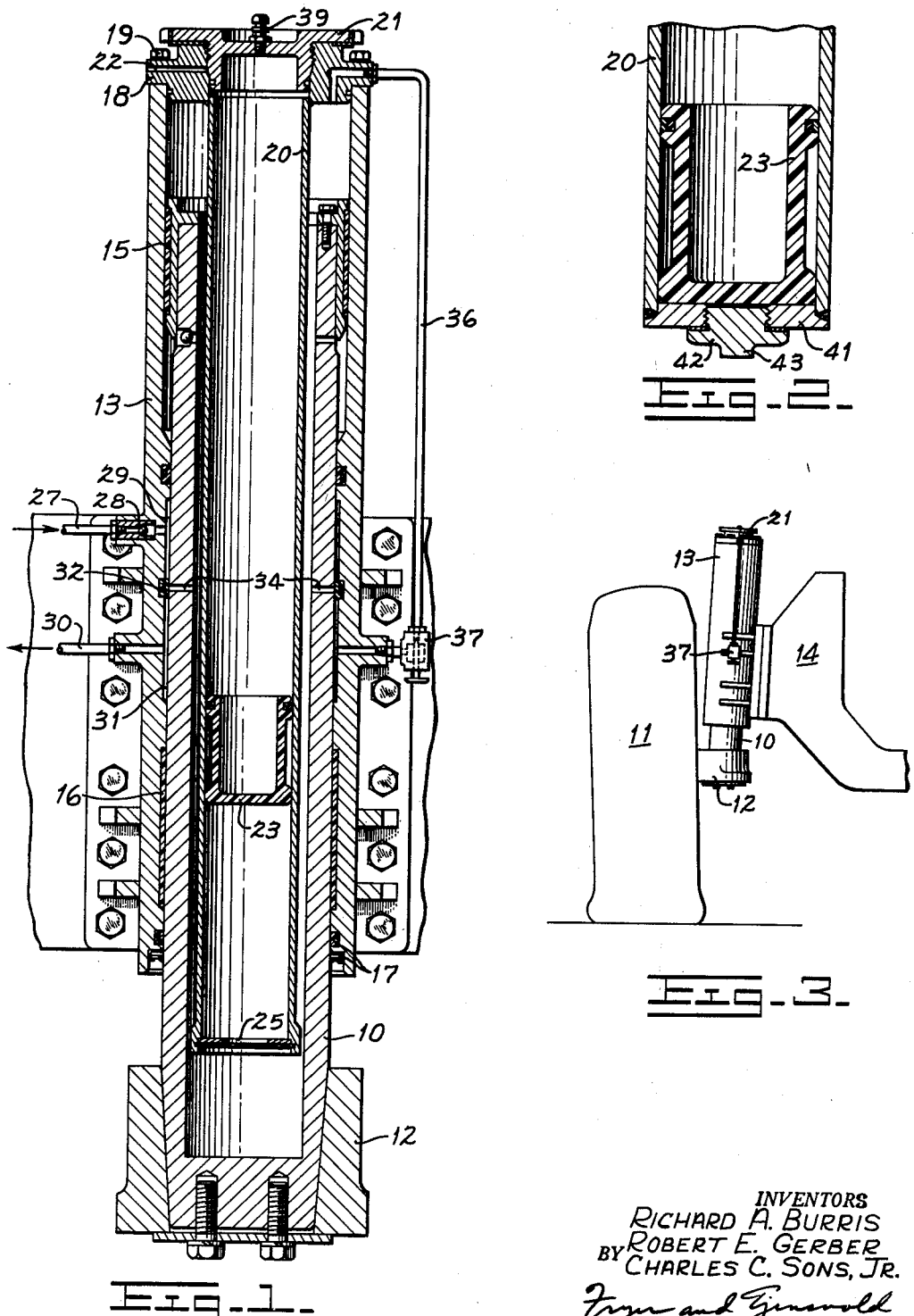
INVENTORS
RICHARD A. BURRIS
ROBERT E. GERBER
BY CHARLES C. SONS, JR.
Fryer and Griswold
ATTORNEYS United States Patent Office 3,128,089
Patented Apr. 7, 1964

3,128,089
SUSPENSION AND HEIGHT CONTROL
SYSTEM FOR VEHICLES
Richard A. Burris, Pekin, and Robert E. Gerber and Charles C. Sons, Jr., Peoria, Ill., assignors to Caterpillar Tractor Co., Peoria, Ill., a corporation of California
Filed Aug. 25, 1961, Ser. No. 133,888
2 Claims. (Cl. 267—64)

This invention relates to vehicle suspension systems of the kind in which a liquid and gas are confined in telescoping parts to provide a resilient and shock absorbing support and of the kind in which the elevation of the suspended part of the vehicle is maintained at a constant distance above the ground regardless of variations in weight resulting from loading of the vehicle.

Where vehicles are suspended by ordinary metal springs as well as in most air spring type suspensions, ground clearance varies with the weight or load carried by the vehicle. This is objectionable particularly in large equipment in service off of the highway and in rough terrain such as encountered in rock quarries and the like. Presently known suspension mechanisms which provide automatic leveling or height control require a separate valve in the fluid system interconnected between the sprung and unsprung masses so that relative movement between the two masses actuates the valve to vary the quantity of fluid in the suspension device. Another disadvantage inherent in suspension mechanisms employing a gas or air spring opposed by hydraulic leveling fluid is the inconvenience encountered in checking the precharge or pressure of the gas in the mechanism prior to the imposition of the weight of the vehicle thereon. This precharge must be checked when there is no external force or weight applied to the suspension mechanism and it has been necessary in many such mechanisms to raise the vehicle from the ground to enable accurate gauging of the gas precharge. This is undesirable because of the usual absence of lift equipment in the areas where the vehicles are working and, therefore, frequent checking is neglected and poor performance is encountered.

It is the object of the present invention to provide a suspension system and height control for vehicles which overcomes the above mentioned disadvantages and which includes simple, positively acting means contained within the mechanism itself for controlling the height of the vehicle above the ground and convenient means for checking gas precharge values without lifting the vehicle from the ground.

Another object of the invention is to provide a liquid and gas suspension mechanism in which the gas is contained in a separate removable and replaceable vessel capable of use as a storage vessel so that gas charged units may be supplied to replace depleted units where ordinary containers of gas under pressure are not available.

The means by which the foregoing and other objects and advantages are attained are set forth in the following specification wherein reference is made to the accompanying drawing illustrating preferred embodiments of the invention.

In the drawing:

FIG. 1 is a central vertical section taken through a suspension device embodying the present invention;

FIG. 2 is a fragmentary view of a portion of the device shown in FIG. 1 but illustrating a modification thereof; and FIG. 3 is a view in elevation showing the assembled position of the device between a vehicle wheel and the body of the vehicle supported thereby.

Referring first to FIGS. 1 and 3, a strut 10 is shown as rigidly connected with a vehicle wheel 11 through its spindle 12. The strut is mounted for vertical reciprocable motion with respect to a cylinder 13 rigidly secured to the vehicle body, the outer end of one axle of which is shown at 14 in FIG. 3. Wear rings of synthane or other durable material are provided as at 15 at the upper end of the strut and at 16 in the lower end of the cylinder to provide replaceable wear surfaces and prevent heavy metal-to-metal contact. Suitable seals as indicated at 17 are also provided adjacent the lower ends of the cylinder 13. The cylinder is provided with a head or cover 18 secured in place thereon as by cap screws 19 and supporting a downwardly extending cylindrical gas chamber 20 which projects into the hollow interior of the strut in spaced relation thereto. The upper end of the gas chamber 20 is closed by a plug 21 threaded into the cover 18. A side vent 22 makes possible safe removal of the plug 21 when the chamber 20 contains gas under pressure. The gas chamber 20 has a floating piston 23 therein, the space above which is charged wth gas under pressure. The space below the floating piston 23 as well as all of the space in the bore of the strut 10 not occupied by the gas chamber and the space in the cylinder 13 above the strut 10 are all charged with liquid which is usually oil.

With the construction above described, the weight of the vehicle is in effect supported on air or compressible gas such as nitrogen and as the cylinder 13 descends under the influence of weight or the piston 10 rises when the wheel encounters an obstruction in the terrain, oil in the upper part of the cylinder is forced downwardly between the gas chamber and bore of the strut and then upwardly in the space below the floating piston 23, the upward movement of which is reacted by the compressible gas. The lower end of the cylinder 20, which contains the gas chamber, is preferably provided with a closure having a restricting orifice 25 therein to damp the flow of oil toward and away from the floating piston 23.

Self leveling or height control is accomplished by adding more liquid to the mechanism shown in FIG. 1 when weight in the body of the vehicle moves the cylinder 13 downwardly from the normal position illustrated and permitting liquid to escape therefrom when, upon absence of weight, the expansion of gas in the chamber 20 causes the cylinder 13 to rise. Additional liquid from the source of liquid under pressure (not shown) is introduced through a conduit 27 and through a check valve 28 into an annular space 29 which surrounds the strut 10. Liquid is exhausted through a conduit 30 in communication with a reservoir or sump (not shown) which also communicates with an annular space 31 surrounding the strut 10. A seal member 32 between the cylinder 13 and strut 10 separates the annular spaces 29 and 31 and in the normal position illustrated closes a plurality of orifices 34 in the wall of the strut which communicate with the main body of liquid in the system. When the load in the vehicle is increased moving the cylinder 13 downwardly, the orifices 34 communicate with a space 29 and liquid under pressure is admitted to the system through the conduit 27. The addition of liquid continues until the piston 13 is returned to its normal position and the seal 32 closes the orifices 34. On the other hand when a load is removed from the vehicle, the cylinder 13 rises until orifices 34 communicate with space 31 permitting liquid to escape through conduits 30 and this continues until the escape of liquid permits return of the cylinder 13 to the normal position where the orifices 34 are again closed by the seal 32. Thus without the use of extraneous valves and linkages, self-leveling and height control are accomplished.

In order to determine the precharge or pressure of gas in the chamber 20, it is necessary that a reading be taken without the weight of the vehicle or its load imposed upon the body of gas in the chamber. The present invention provides means for relieving the load on this body of gas without raising the vehicle from the ground and this is accomplished by a conduit 36 communicating between the liquid under pressure in the upper portion of the cylinder 13 and the low pressure relief area 31. A valve 37 controls flow of fluid through the line 36 and, when it is desired to measure the precharge of the gas in chamber 20, the valve 37 is opened bleeding liquid from the cylinder outwardly through the space 31 and discharge line 30 until the lower end of the cylinder 13 rests upon the spindle portion 12 shown in FIG. 1 and the entire weight of the vehicle is mechanically supported. At this time piston 23 moves to the lower end of chamber 20 where it rests on the closure plate to block orifice 25 so that the gas chamber 20 has a known fixed volume during the checking of pressure therein. A pressure gauge may then be placed in communication with the gas chamber through a fitting 39 provided for that purpose in the plug 21. The same fitting may be used for the purpose of adding gas or air to the chamber 20 in the event that the pressure therein falls below the value required for providing the desired riding qualities of the vehicle. This check of the gas pressure must be made when the pump which supplies fluid through the line 27 is not in operation so that make-up fluid will not be pumped into the system through the ports 34 which are open to the passage 29 when the cylinder 13 moves downwardly. The check valve 28 also serves when the pump is not operating to prevent fluid in the system from escaping through the line 27 if a load is placed on the vehicle which depresses the cylinder 13 to a position where ports 34 register with space 29 when there is no pressure in the line 27.

It is common practice to use either air or gas in the gas chamber 20, nitrogen gas being used in may cases where a source of compressed air is not available and the gas can be purchased in bottles or pressure tanks and conveyed to the site where vehicles are operating. An inert gas is also preferred because of the absence of rust producing oxygen. There are also locations where it is difficult to obtain pressurized nitrogen and the present invention contemplates the use of the gas chamber 20 itself as a container for nitrogen or other inert gas under pressure which may be stored for long periods of time and which may be used as a replacement for the gas chamber shown in FIG. 1. This is accomplished by the structure shown in FIG. 2 wherein the lower end of the gas cylinder 20 is shown as closed by a bottom plate 41 with a threaded orifice therein, instead of the orifice shown at 25 in FIG. 1, closed by a threaded plug 42. This plug may be provided with a gasket as shown so that a perfect seal is formed against the escape of gas which may be contained and stored in the cylinder at the prescribed pre-load pressure. The floating piston 23 is forced to the bottom of the cylinder when it is charged with gas and will seek its normal position in the chamber when the plug 42 is removed and the cylinder, together with the cover 18 which supports it and the plug 21 which closes its upper end is inserted in place. The plug 42 has a downwardly extending end 43, the length of which is such that it will abut the bottom surface of the bore in the strut 10 when the cylinder 13 is in its lowermost position to prevent assembly of a replacement gas chamber unless the plug is first removed therefrom. This insures against assembly of the parts in an inoperable condition.

We claim:

1. In a vehicle suspension system, a vertically disposed hollow strut fixed relative to a vehicle wheel, a cylinder fixed to the vehicle body and telescoping downwardly over said strut to provide therewith a liquid chamber of variable capacity, a cylindrical gas chamber extending downwardly from the upper end of said cylinder into said strut and having an open lower end, and a floating piston therein to confine gas to its upper portion whereby weight imposed on said cylinder will cause said floating piston to move upwardly against the pressure of gas in the gas chamber, and means operable upon raising and lowering of the cylinder relative to the strut to decrease and increase respectively the volume of liquid in said liquid chamber to maintain the cylinder and suspended vehicle at a constant elevation relative to the ground.

2. In a vehicle suspension system, a vertically disposed hollow strut fixed relative to a vehicle wheel, a cylinder fixed to the vehicle body and telescoping downwardly over said strut to provide therewith a liquid chamber of variable capacity, a cylindrical gas chamber extending downwardly from the upper end of said cylinder into said strut and having an open lower end, and a floating piston therein to confine gas to its upper portion whereby weight imposed on said cylinder will cause said floating piston to move upwardly against the pressure of gas in the gas chamber, and means operable upon raising and lowering of the cylinder relative to the strut to decrease and increase respectively the volume of liquid in said liquid chamber to maintain the cylinder and suspended vehicle at a constant elevation relative to the ground, said means comprising a recess between the walls of the strut and cylinder communicating with a high pressure liquid source, a similar recess below the first recess communicating with a discharge line, an orifice in the wall of the strut normally positioned between said recesses, and sealing means in the cylinder wall normally closing said orifice.

References Cited in the file of this patent

UNITED STATES PATENTS

| | | |
|---|---|---|
| 2,222,845 | Johnson | Nov. 26, 1940 |
| 2,294,918 | Levy | Sept. 8, 1942 |
| 2,735,674 | Smith et al. | Feb. 21, 1956 |
| 2,982,538 | Bourcier de Carbon | May 2, 1961 |